US012258157B2

(12) United States Patent
Czarnecki et al.

(10) Patent No.: US 12,258,157 B2
(45) Date of Patent: Mar. 25, 2025

(54) BEVERAGE MULTIPACKS

(71) Applicant: ILLINOIS TOOL WORKS INC., Glenview, IL (US)

(72) Inventors: Michael Phillip Czarnecki, Bensenville, IL (US); Bryan Michael Schertzer, Geneva, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/962,103

(22) Filed: Oct. 7, 2022

(65) Prior Publication Data

US 2023/0109936 A1 Apr. 13, 2023

Related U.S. Application Data

(60) Provisional application No. 63/253,766, filed on Oct. 8, 2021.

(51) Int. Cl.

*B65B 13/18* (2006.01)
*B65B 13/32* (2006.01)
*B65B 17/02* (2006.01)
*B65B 61/26* (2006.01)

(Continued)

(52) U.S. Cl.

CPC ............ *B65B 13/182* (2013.01); *B65B 13/32* (2013.01); *B65B 17/02* (2013.01); *B65B 61/26* (2013.01); *B65C 3/163* (2013.01); *B65D 71/50* (2013.01)

(58) Field of Classification Search

CPC ....... B65B 13/182; B65B 13/32; B65B 17/02; B65B 61/26; B65C 3/163; B65D 71/50

See application file for complete search history.

(56) References Cited

U.S. PATENT DOCUMENTS 2,677,460 A * 5/1954 Johnson ................. B65D 71/50 229/117.14
3,759,373 A * 9/1973 Werth ................ B65D 21/0205 206/139

(Continued)

FOREIGN PATENT DOCUMENTS

DE 10 2013 113309 6/2015
EP 3022118 1/2015
WO WO 2007/121152 10/2007

OTHER PUBLICATIONS

ISA/US, English language verison of the International Search Report, Form PCT/ISA/220, for International Application PCT/US2022/046144, Oct. 10, 2022 (7 pages).

(Continued)

*Primary Examiner* — Joshua G Kotis
*Assistant Examiner* — Scott A Howell
(74) *Attorney, Agent, or Firm* — Pauley Erickson & Swanson

(57) ABSTRACT

A method of forming a multipack of a plurality of containers includes a label on each container of the plurality of containers. The label at least partially surrounds a portion of each container of the plurality of containers. The method includes assembling the plurality of container into a multipack, heating an area of the multipack that includes the label, and forming an adhesive bond on the heated area of the label on each container. Each container is secured to at least one other container by the adhesive bond.

7 Claims, 2 Drawing Sheets

(51) Int. Cl.
*B65C 3/16* (2006.01)
*B65D 71/50* (2006.01)

(56) References Cited

U.S. PATENT DOCUMENTS

| | | | | | |
|---|---|---|---|---|---|
| 3,902,992 | A * | 9/1975 | Schuster | B65D 21/0205 206/427 |
| 4,606,454 | A * | 8/1986 | Hambleton | B65D 71/50 206/432 |
| 2007/0141207 | A1* | 6/2007 | Boudrie | B65D 71/0085 426/129 |
| 2011/0147258 | A1* | 6/2011 | Hartness | B29C 63/423 493/186 |
| 2013/0071585 | A1 | 3/2013 | Kettwig et al. | |
| 2015/0034503 | A1 | 2/2015 | Kettwig | |
| 2016/0114919 | A1* | 4/2016 | Jöhren | B65B 17/02 156/69 |
| 2018/0009557 | A1* | 1/2018 | Fischer | B65B 17/025 |
| 2019/0135501 | A1* | 5/2019 | Chandra | G06K 19/07798 |

OTHER PUBLICATIONS

ISA/US, Form PCT/ISA/237, Written Opinion of the International Searching Authority, for International Application PCT/US2022/046144, Oct. 10, 2022 (6 pages).

* cited by examiner

BEVERAGE MULTIPACKS

CROSS-REFERENCE TO RELATED APPLICATIONS

This application claims priority to U.S. Provisional Application, Ser. No. 63/253,766, filed 8 Oct. 2021. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates generally to beverage multipacks and, more particularly, to multipacks made up of a plurality of containers.

Description of Prior Art

Conventional container carriers are often used to unitize a plurality of similarly sized containers, such as cans, bottles, jars and boxes and/or similar containers that require unitization. Flexible plastic ring carriers are one such conventional container carrier.

There is a desire to reduce waste associated with beverage multipacks, specifically those with flexible plastic ring carriers. A carrier that "disappears" following use is advantageous from a waste stream perspective. One such "disappearing carrier" includes adding glue dotes to hold beverage containers together to form a multipack. Glue dots are expensive and ineffective in holding beverage containers together. Multipack carriers must be able to withstand the rigors of high-speed application to containers. Current applied adhesive solutions, such as the glue dots, do not allow for multipacks to be assembled at the speeds needed for commercial operations. As such, a need arises for an improved multipack capable of carrying a large number of containers that permits high speed application and results in an aesthetically pleasing package for the consumer to handle.

SUMMARY OF THE INVENTION

The invention generally relates to a method of forming a multipack of a plurality of containers.

The general object of the invention can be attained, at least in part, through providing a label on each container of the plurality of containers. The label at least partially surrounds a portion of each container of the plurality of containers. The method includes assembling the plurality of containers into a multipack and heating the multipack and/or a targeted area of the multipack. The targeted area may include the label on each container. An adhesive bond is preferably formed on the area of the label on each container. Each container is secured to at least one other container by the adhesive bond. The multipack includes at least two containers. Each container of the plurality of containers is secured to at least one other container of the plurality of containers.

The method according to the invention may further include integrating a metallic element with the label of each container. The metallic element may absorb heat to activate the adhesive material and/or bond. The heating of the area of the multipack may include inductive heating. The heating of the area of the multipack may also or alternatively include ultrasonic welding.

The general object of the invention can also be attained, at least in part, through a method of forming a multipack of a plurality of containers, by providing a label on each container of the plurality of containers. The label preferably includes a plurality of layers. The method may also include heating the label on each container, activating an adhesive material on the label on each container, securing each container to at least one other container by the adhesive material and assembling the plurality of containers into a multipack.

A layer of the plurality of layers may include a metal element. Another layer of the plurality of layers may include the adhesive material. Yet another layer of the plurality of layers may include a barcode. The label at least partially surrounds a portion of each container of the plurality of containers.

A further object of the invention can be attained through a multipack of a plurality of containers. The multipack includes a label positioned on a portion of each container of the plurality of containers, a metal element integrated with the label and a heat-activated adhesive element integrated with the label.

The heat-activated adhesive element of one container of the plurality of containers sticks to the adhesive element of another container of the plurality of containers. The multipack preferably includes at least two containers.

Other objects and advantages will be apparent to those skilled in the art from the following detailed description taken in conjunction with the appended claims and drawings.

DETAILED DESCRIPTION OF THE INVENTION

The present invention provides beverage multipacks. The multipacks include the use of a functional sleeve or label on a beverage container. The label has an area that can be activated preferably by an inductive field to heat the area. The heated area activates a material that performs as an adhesive when heated. The activated adhesive is used to attach multiple beverage containers to form the multipacks.

Figure 1:
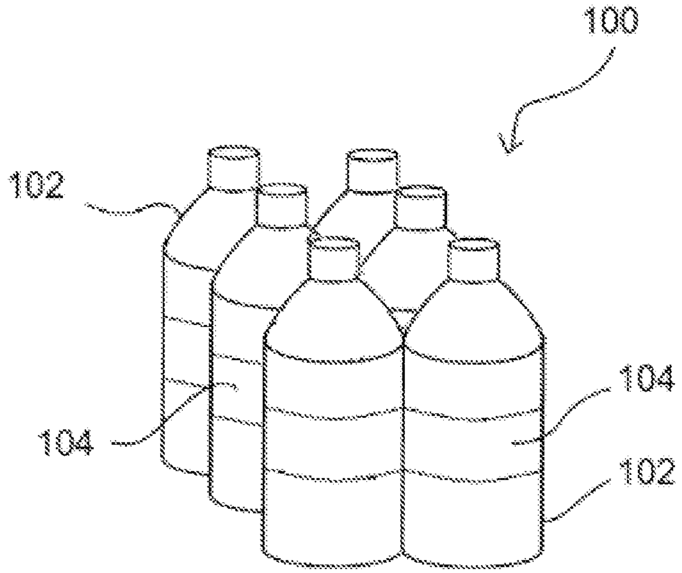
FIG. 1 shows a perspective view of a multipack of containers according to one embodiment of the invention.

FIG. 1 shows a multipack 100 according to one embodiment of the invention. The multipack 100 includes a plurality of containers 102. The multipack 100 according to FIG. 1 includes six containers 102. The multipacks of according to the invention preferably include at least two containers, although any number of containers may be used.

The containers 102 of the multipack 100 are arranged in longitudinal rows and transverse ranks. Each container 102 includes a label 104 that at least partially surrounds a portion of the container 102. As shown, the label 104 wraps around a circumference of the container, at a predominantly mid-point along a height of the container. This placement of the labels 104, specifically for bottles as shown in FIG. 1, is preferential as the labels are present along a widest part of the containers. As a wide variety of containers may be used including various shapes and sizes, the size and placement of the labels can be adjusted accordingly.

Figure 2:
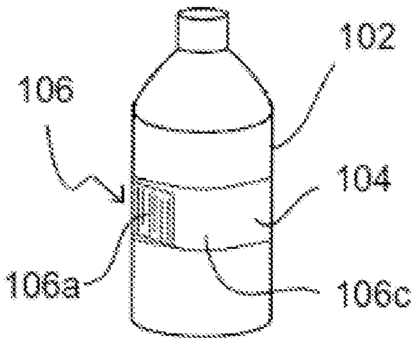
FIG. 2 shows a front view of a container according to one embodiment of the invention.

FIG. 2 shows a single container 102 of the plurality of containers. The label 104 is made up of a plurality of layers 106. One layer of the plurality of layers 106 includes a barcode 106*a*. Another layer of the plurality of layers 106 includes an adhesive bond 106*b*. The adhesive bond 106*b* allows for temporary adhesion through the use of an adhesive, activated through inductive heating or ultrasonic welding. The adhesive itself can be integrated into material used for the label 104, on the beverage container 102, or applied as a separate element. For example, in one embodiment where the plurality of containers are cans, the adhesive can come from polyethylene and/or polypropylene on the cans themselves. T Another layer of the plurality of layers 106 includes a heat-absorbing element 106*c*. The heat-absorbing element 106*c* is preferably metal, or any other material that will heat up faster than the containers and their contents. The heat-absorbing or metal element 106*c* is enclosed within the plurality of layers 106 of the label 104. The metal element 106*c* can heat in an inductive filed and activate the adhesive element 106*b* on the label 104 so an adhesive bond forms with another container 102. The adhesive element 106*b* sticks to the adhesive element 106*b* of another container, resulting in an evenly-shaped multipack. However, the adhesive element is capable of sticking to any number of placements on a container.

Figure 3:
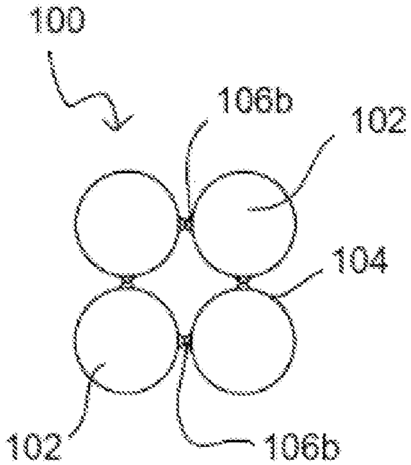
FIG. 3 shows a top cross-sectional view of a multipack according to one embodiment of the invention.

As shown in FIG. 3, the adhesive element 106*b* on the label 104 of one container 102 sticks to an adhesive element 106*b* on the label 104 of at least one other container 102. As each container 102 of the plurality of containers that form the multipack 100 includes a label 104 with an adhesive element 106*b*, the plurality of containers stick to each other via the adhesive element 106*b* to form the multipack 100. In some embodiments of the invention where the containers are cans, an induction heater can heat up polyethylene and/or polypropylene on the cans to weld the cans together to form the multipack. Specifically, the metal element can heat a polypropylene coating on an outside of a plurality of cans so that the cans can be welded together.

Ultrasonic welding can also be used to activate the adhesive elements 106*b* to bond containers 102 together through the attached labels 104. For example, in embodiments of the invention where the containers are bottles (such as shown in FIGS. 1-2), the label can be used to weld the bottles together to form the multipack. The metal element can be a metal tape inserted in between individual bottles, or the labels can include the metal element. The bond area and strength of the connection to form the multipack 100 keeps the multipack intact until such time an end use consumer wants to separate a container from the multipack matrix. In accordance with embodiments of the invention, a beverage producer can quickly assemble beverage multipacks at a commercial scale without the need for a separate packaging product.

Figure 4:
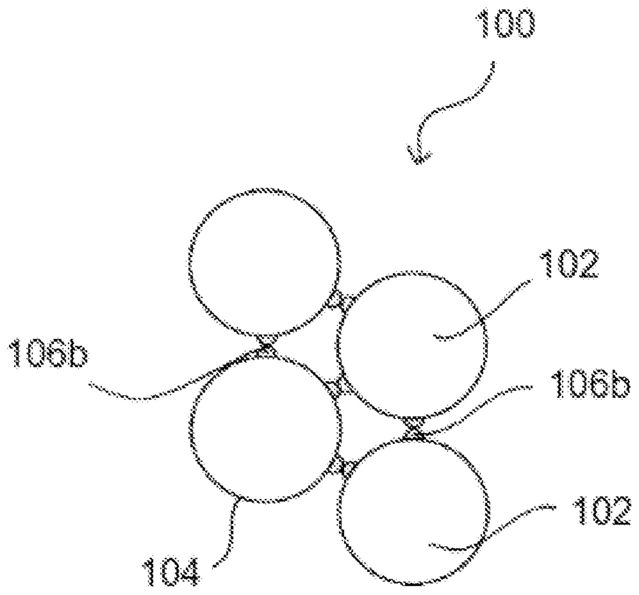
FIG. 4 shows a top cross-sectional view of a multipack according to one embodiment of the invention.

FIG. 4 shows a multipack 100 where the containers 102 are attached to one another in a staggered arrangement. As the adhesive layer 106*b* on the labels 104 of the containers 102 may surround the whole container, different multipack arrangements and shapes are also possible. Likewise, some embodiments may not include labels so the containers themselves can be welded together.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of forming a multipack of a plurality of containers, the method comprising the steps of:

providing a label on each container of the plurality of containers, wherein the label at least partially surrounds a portion of each container of the plurality of containers;

integrating a metal element with the label of each container;

assembling the plurality of containers into a multipack;

heating the metal element of the label of each container;

forming an adhesive bond on at least a portion of the label along the metal element between each container; and securing each container to at least one other container by the adhesive bond.

2. The method of forming a multipack of a plurality of containers according to claim 1, further comprising heating a targeted area of the multipack, wherein the area comprises the label on each container.

3. The method of forming a multipack of a plurality of containers according to claim 1, wherein the multipack comprises at least two containers.

4. The method of forming a multipack of a plurality of containers according to claim 1 wherein each container of the plurality of containers is secured to at least two other containers of the plurality of containers.

5. The method of forming a multipack of a plurality of containers according to claim 2 wherein the heating of the targeted area of the multipack comprises inductive heating.

6. The method of forming a multipack of a plurality of containers according to claim 2 wherein the heating of the targeted area of the multipack comprises ultrasonic welding.

7. The method of forming a multipack of a plurality of containers according to claim 1 wherein the label of each container comprises a barcode.

* * * * *